United States Patent [19]

Welsch

[11] Patent Number: 5,034,959
[45] Date of Patent: Jul. 23, 1991

[54] GAS LASER AND METHOD OF MANUFACTURING THE SAME

[75] Inventor: Wolfgang Welsch, Baldham, Fed. Rep. of Germany

[73] Assignee: Siemens Aktiengesellschaft, Munich, Fed. Rep. of Germany

[21] Appl. No.: 487,622

[22] Filed: Mar. 2, 1990

[30] Foreign Application Priority Data

Mar. 2, 1989 [EP] European Pat. Off. ........ 89103685.7

[51] Int. Cl.$^5$ ................................................ H01S 3/03
[52] U.S. Cl. ........................................ 372/65; 372/64; 372/55
[58] Field of Search ........................ 372/65, 61, 64, 55

[56] References Cited

U.S. PATENT DOCUMENTS

| | | | |
|---|---|---|---|
| 3,988,698 | 10/1976 | Crane et al. | 331/94.5 D |
| 4,081,762 | 3/1978 | Golser et al. | 372/65 |
| 4,203,080 | 5/1980 | Wright et al. | 372/107 |
| 4,352,185 | 9/1982 | Crane | 372/29 |
| 4,644,554 | 2/1987 | Sheng | 372/65 |
| 4,799,232 | 1/1989 | Welsch | 372/61 |
| 4,864,582 | 9/1989 | Barth et al. | 372/61 |

FOREIGN PATENT DOCUMENTS 0262352 4/1988 European Pat. Off. .
2506842 8/1976 Fed. Rep. of Germany .

Primary Examiner—Leon Scott, Jr.
Attorney, Agent, or Firm—Hill, Van Santen, Steadman & Simpson

[57] ABSTRACT

The capillary of the gas laser is fastened with respect to the housing tube in a particularly accurate and tension high free manner in that a support is provided in the housing tube which is not in direct contact with the capillary, but is connected to the capillary in a mechanically-rigid fashion by way of glass solder. The invention is particularly advantageous in helium-neon lasers and lasers having long capillaries.

9 Claims, 1 Drawing Sheet

GAS LASER AND METHOD OF MANUFACTURING THE SAME

BACKGROUND OF THE INVENTION

1. Field of the Invention

The present invention relates to a gas laser of the type having an anode and a cathode and a capillary integrated in a housing tube, in which the housing tube is terminated by way of optical elements in the direction of the capillary, in which the capillary is connected with the housing tube in a mechanically-rigid fashion on the side on the anode, and in which a support is attached spaced to the side of the anode to fasten the capillary against the housing tube in the radial direction, the support including an aperture receiving the capillary therethrough.

2. Description of the Prior Art

A gas laser of the type generally set forth above is known from the U.S. Letters Pat. 4,799,232. There, it is suggested to connect the individual parts of the laser by means of glass solder. U.S. Letters Pat. 3,988,698 discloses a method, whereby the individual parts of a gas laser are threaded/lined up on at least one rod and are sensored in their mutual positions until they are connected with one another, for example, by welding.

It was found in the case of lasers with relatively long capillaries in which the capillaries are supported in the radial direction against the wall of the housing by a additional support, that due to this rest, which is generally fashioned elastically, those forces can affect the capillary that are not completely symmetrical, and that the capillary is therefore maladjusted after the assembly thereof and a reduced laser power results.

SUMMARY OF THE INVENTION

The object of the present invention is to provide a gas laser with an anode and a cathode and a capillary integrated in a housing tube, of the type in which the housing is terminated by way of optical elements in the direction of the capillary, in which the capillary is connected with the housing tube in a mechanically-rigid fashion on the side of the anode, and in which a support is attached, spaced, to the side of the anode, the support fastening the capillary against the housing tube in the radial direction, the support including an aperture for receiving the capillary therethrough, which is particularly characterized in that the support is not in direct contact with the capillary, that the support is soldered to the capillary with glass solder and in that this indirect connection with the capillary fastens its radial position in the housing. The solder connection provided in accordance with the present invention between the support and the capillary compensates even slight tolerances of the mutual positions of the support and the capillary, a tension/stress-free/non-tension structure results from the soldering, and the capillary cannot afterwards be pushed away from its position.

For the mounting of the support in the housing tube, one of the known solutions can be applied. For example, finger-type springs can be provided pressing against the housing wall, or, a metal spring can be fastened in its position by shrinking the housing tube.

At the transition to the housing tube, the support must not be fashioned elastically, particularly if the temperature coefficients of the support and the housing tube are adapted to one another. It is advantageous, however, to fashion the support from elastic material, if this adaptation of temperature coefficients is not desirable or possible. An advantageous embodiment of the support is a dynamically-balanced fashioning and elastic lamellae pressing against the housing tube.

Advantageously, a gas laser constructed in accordance with the present invention is manufactured with a method in which all of the parts of the laser, including glass solder rings for the generation of the desired soldering spots, are brought into the desired mutual positions by way of at least one rod, and are soldered with one another in a single pass, and in that the support is thereby held in its final position via the housing tube. Given this embodiment of the method, the housing tube can be composed of various materials, preferably a glass or ceramic.

Another advantageous method is that of a glass solder ring being provided for soldering the support to the capillary, in that the other parts are connected with each other with one of the known methods, and in that the support is soldered to the capillary independently therefrom by light soldering. Light soldering here means that light is irradiated through the housing and is absorbed at a high degree from the soldering location not, however, from the housing so that the solder at the support melts and generates the soldering without the capillary or the housing softening or melting. Advantageously, the light soldering is thereby performed via a laser. For the soldering of the support to the capillary, advantageously a solder is used which absorbs the light radiation provided for the soldering much stronger than the material of the housing tube. In the case of a laser soldering the material of the capillary can be arbitrarily selected if the laser is directed accurately to the solder ring, and a too strong warm up of the capillary is prevented. If a correspondingly-accurate guidance of the laser beam is not desired, the selection of the material for the capillary, which does not absorb the used laser radiation, or only to a very small extent, is advantageous.

The two basic methods disclosed herein provide that one can make do without rotating the tube. The warm up in a furnace requires a relatively long time of, for example, one to two hours, but, on the other hand, has the advantage that simultaneously an entire row/series of tubes can be soldered together. The light soldering and particularly a laser soldering require only little time. With this technique, the light source can be easily pivoted around the subject to be soldered, and no rotation of the subject is necessary.

The application of the known flame soldering whereby the heat cannot be transported directly to the interior soldering location must be ruled out in the method of the invention since the soldering must occur after assembly of the tube, i.e. after the integration of the cathode which is usually composed of aluminum, whereby the subsequent warm up leads to overheating and to destruction of the cathode, usually composed of aluminum, before the glass solder at the capillary starts to melt. A high-frequency soldering also leads to overheating and destruction of the cathodes given the standard dimensions of the tubes.

The method set forth herein enable a particularly accurate adjustment of the capillary since the adjustment remains intact during the soldering process, and after the soldering flow has cooled, the force distribution via the soldered spot to the spring is uniform and is n longer altered.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
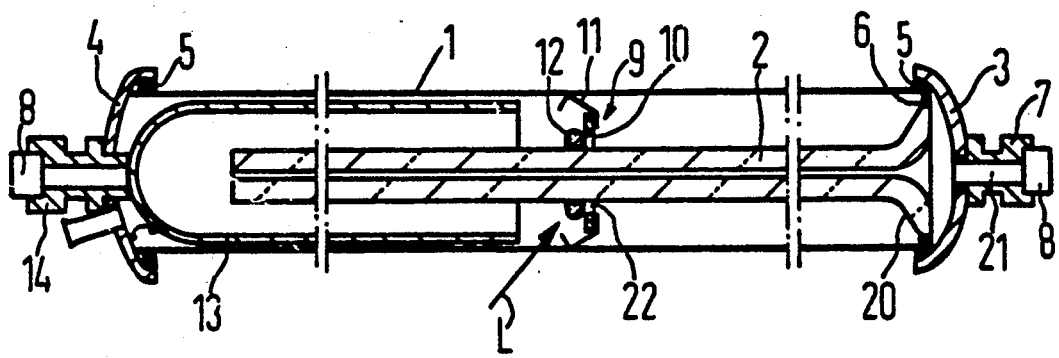
FIG. 1 is a longitudinal cross sectional view of a laser constructed in accordance with the present invention before the support is soldered to the capillary.

Referring to the drawing, a housing tube 1 is connected in a vacuum-tight manner with a pair of end pieces 3 and 4 via respective solder connections 5. The end pieces 3 and 4 are fashioned as metal caps. They can also be manufactured from sintered glass in a known manner as described, for example, in the German published application 36 32 502. With the end pieces, mirror mountings 7 and 14 are connected in a vacuum-tight manner and carry respective mirrors 8. The mirror mounting 7 simultaneously serves as an anode. Opposite therefrom, a cathode 13 is arranged in the housing tube 1.

A capillary 2 has a widened end region 20. The end region 20 is connected in a mechanically-rigid fashion with the housing tube 1 via a solder connection 6. The capillary 2 and respective bores 21 in the mirror mountings 7 and 14 are accurately coaxially adjusted to one another. A support 9 for the capillary 2 is arranged approximately in the center of the capillary 2, however, leaves a free intermediate space 22. A solder ring 12, preferably composed of glass solder, is arranged limiting the support 9. For the finishing process for the laser tube, light is transmitted in the direction indicated by the arrow L, which light is absorbed by the soldering 12. The light, however, passes through the housing tube without considerable absorption. As a light source for the light beam L, a laser having a suitable wavelength is provided. As a solder ring 12, a glass solder is particularly suitable which absorbs considerably more than the housing tube, in the region of the wavelength of the laser light beam. One can, for example, add a correspondingly-absorbing substance to the glass solder. Under the effect of the light beam L, the solder ring 12 melts together with the capillary 2 and the support 9, without the result of mechanical tensions in the capillary tube. The always present asymmetries, which are caused, for example, by the different dimensions of the spring strips 11 within acceptable tolerances merely affect the position of the support 9 and thus the range of the free space 22. They are completely evened out due to the melting solder.

In the described example, the support 9 is composed of a ring 10 and spring strips 11, whereby at least three spring strips 11 are advantageous. The ring 10 can be composed of metal or ceramic.

Figure 2:
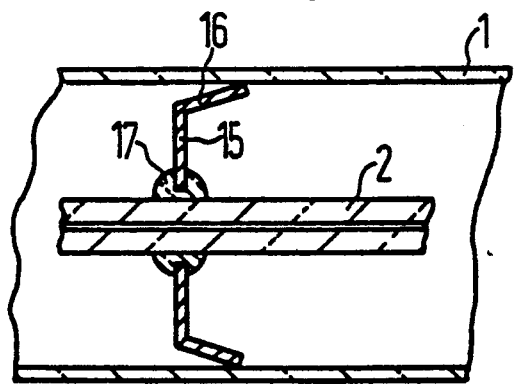
FIG. 2 is a fragmentary sectional view illustrating an embodiment of a support for the capillary.

In the exemplary embodiment illustrated in FIG. 2, a disk 15 and spring strips 16 are connected with each other as a single piece. The solder 17 is already melted in this illustration.

Figure 3:
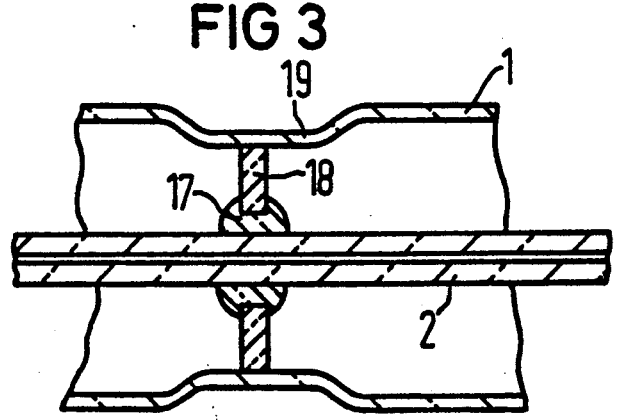
FIG. 3 is a fragmentary sectional view illustrating another embodiment of a support for the capillary.

In FIG. 3, only a ring 18 is provided which is held by a reduced diameter section 19 of the housing 1. The solder 17 is likewise already melted in this example and in the final position. The ring 18 in this example is advantageously manufactured from a material that is adapted to the housing tube 1 with respect to the temperature coefficient thereof. It can be composed of metal, glass, ceramic. Minor differences in the expansion coefficient are picked up by the solder 17 between the ring and the capillary. Hereby, glass solder is preferably applied as the solder. As material for the capillary glass, ceramic can be applied.

For the manufacturing of a laser according to the present invention, the mirror mounting 7 and 14 with the end pieces 3 and 4, the cathode 13 and the solder rings 5, the housing tube and the capillary tube are lined up on at least one rod and adjusted relative to one another in true alignment, after the support 9 and the solder ring 12 have been slipped on the capillary 2 and brought to the corresponding location in the housing tube 1. In this condition, the parts are soldered together in a furnace in one single pass. Therefore, an accurately adjusted, tension-free laser results. This method is suitable for the simultaneous soldering of a plurality of lasers. The relatively long soldering time of, for example, one hour therefore nevertheless results in a rational manufacturing process.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A gas laser comprising:

a housing tube;

an elongate capillary extending coaxially in and secured at one end to said housing tube in cantilever fashion;

anode means mounted at the end of said housing tube which is connected to said capillary and in communication with said capillary;

cathode means mounted at the other end and extending into said housing tube; and a support connected to the inner surface of said housing tube at a point which is spaced from said one end of said capillary, said support including an aperture therethrough which is larger than the cross sectional dimensions of said capillary so that said capillary is received therethrough in a non-contacting manner; and a solder ring about said capillary on said support, said solder ring securing said capillary to said support so as to provide radial support of said capillary.

2. The gas laser of claim 1, wherein:
said support comprising elastic material.

3. The gas laser of claim 1, wherein:
said support comprises a ring and a plurality of spring strips connected therethrough, said spring strips pressing against the inner surface of said housing tube.

4. The gas laser according to claim 3, wherein:
said ring and said spring strips are integrally connected as a single piece.

5. A method for manufacturing a gas laser which comprises a housing tube, an elongate capillary extending coaxially in and secured at one end to said housing tube in cantilever fashion, anode means including an anode, mounted at the end of said housing tube which is connected to said capillary and in communication with said capillary, cathode means mounted at the other end and extending into said housing tube, a support connected to the inner surface of said housing tube at a point which is spaced from said one end of said capillary, said support including an aperture therethrough which is larger than the cross sectional dimensions of said capillary so that said capillary is received therethrough in a non-contacting manner, and a solder ring about said capillary on the side of said support facing away from said anode means, said solder ring provided for securing said capillary to said support so as to provide radial support of said capillary, comprising the step of:

positioning and holding the light-permeable housing tube, the elongate capillary, the anode means, the cathode means and the support in desired mutual positions;
 inserting glass solder rings at the junctions of the housing tube with the anode means and the cathode means and at the location of the aperture about the capillary; and
 soldering all of the mentioned junctions with the respective solder rings in a single soldering pass.

6. A method of manufacturing a gas laser which comprises a light-premeable housing tube, an elongate capillary extending coaxially in and to be secured at one end of the housing tube in cantilever fashion, anode means, including an anode, to be mounted at the end of the housing tube which is to be connected to the capillary and in communication with the capillary, cathode means to be mounted at the other end and extending into the housing tube, a support connected to the inner surface of the housing tube at a point which is spaced from said one end of the capillary, the support including an aperture therethrough which is larger than the cross sectional dimensions of the capillary so that the capillary is received therethrough in a non-contacting manner, and a solder ring about the capillary on a side of the support, the solder ring to secure the capillary to the support so as to provide radial support of the capillary, comprising the steps of:

connecting the capillary and the anode means to the housing tube at the one end;
 connecting the cathode means to the other end of the housing tube;
 connecting the support to the inner surface of the housing tube;
 positioning the solder ring about the capillary and against one side of the support; and
 light soldering the support to the capillary via the soldering ring.

7. The method of claim 6, wherein the step of light soldering is further defined as:
 soldering with a laser.

8. The method of claim 7, wherein the step of positioning the solder ring is further defined as:
 selecting a solder ring of a material which absorbs light radiation necessary for light soldering more strongly than the material of the housing tube.

9. A gas laser comprising:
 a housing tube;
 an elongate capillary extending coaxially in and secured at one end to said housing tube in cantilever fashion;
 anode means mounted at the end of said housing tube which is connected to said capillary and in communication with said capillary;
 cathode means mounted at the other end and extending into said housing tube;
 a support connected to the inner surface of said housing tube at a point which is spaced from said one end of said capillary, said support comprising a disk having a temperature coefficient adapted to that of said housing tube and including an aperture therethrough which is larger than the cross sectional dimensions of said capillary so that said capillary is received therethrough in a non-contacting manner;
 a solder ring about said capillary at said support, said solder ring securing said capillary to said support so as to provide radial support of said capillary; and
 said housing tube including a reduced diameter section clamping said support in place.

* * * * *